United States Patent [19]

Chronister

[11] 4,145,026
[45] Mar. 20, 1979

[54] VALVE WITH SELF-ACTUATING FLUID SEAL

[76] Inventor: Clyde H. Chronister, #4 Kings Row, Houston, Tex. 77069

[21] Appl. No.: 826,299

[22] Filed: Aug. 22, 1977

[51] Int. Cl.² ............................................. F16K 31/44
[52] U.S. Cl. ..................................... 251/80; 251/159; 251/167; 251/199
[58] Field of Search ............... 251/159, 167, 189, 191, 251/197, 199, 80

[56] References Cited

U.S. PATENT DOCUMENTS

| | | | |
|---|---|---|---|
| 2,726,842 | 12/1955 | Seamark | 251/172 X |
| 2,825,528 | 3/1958 | Truitt | 251/197 X |
| 3,642,248 | 2/1972 | Benware | 251/172 |
| 3,711,062 | 1/1973 | Kirkwood | 251/172 |
| 3,743,244 | 7/1973 | Dickenson | 251/197 |

*Primary Examiner*—Harold W. Wealsley
*Attorney, Agent, or Firm*—Fulbright & Jaworski

[57] ABSTRACT

A valve having a body with a valve seat and valve element and actuating means for moving the valve element toward and away from the valve seat with stop means in the body for stopping the movement of the valve element when the element is positioned against the valve seat. Fluid-actuated seal means are provided for sealing between the valve seat and the valve element and fluid-actuation means including a piston and cylinder which are in fluid communication with the seal means for actuation of the seal means. The fluid-actuation means are connected to the valve-actuating means whereby the seal means are pressurized and relieved by movement of the valve-actuating means. A lost motion connection is provided between the valve-actuating means and the valve element for allowing the fluid-actuation means to pressurize and release the seal means without movement of the valve element and spring means are provided between the valve-actuating means and the valve element for allowing setting and release of the seal means without movement of the valve element. The fluid-actuated seals and the fluid-actuation means may be positioned in either the valve element or in the seat. The fluid-actuation means may be a closed system or may be an open system.

3 Claims, 6 Drawing Figures

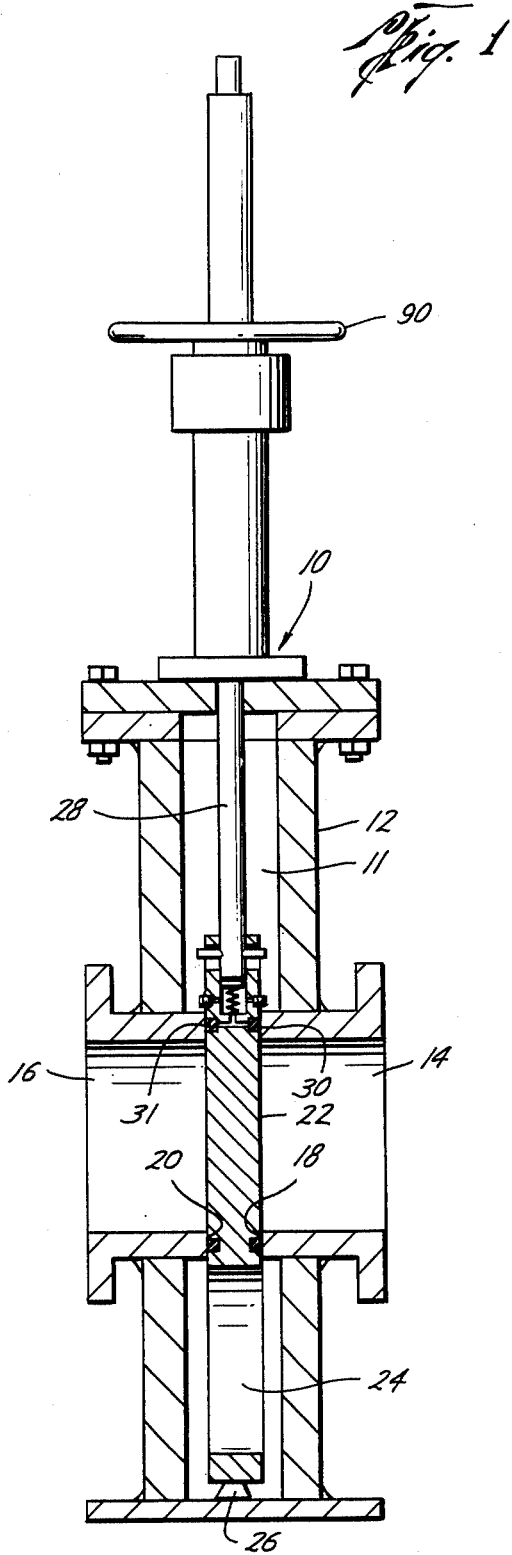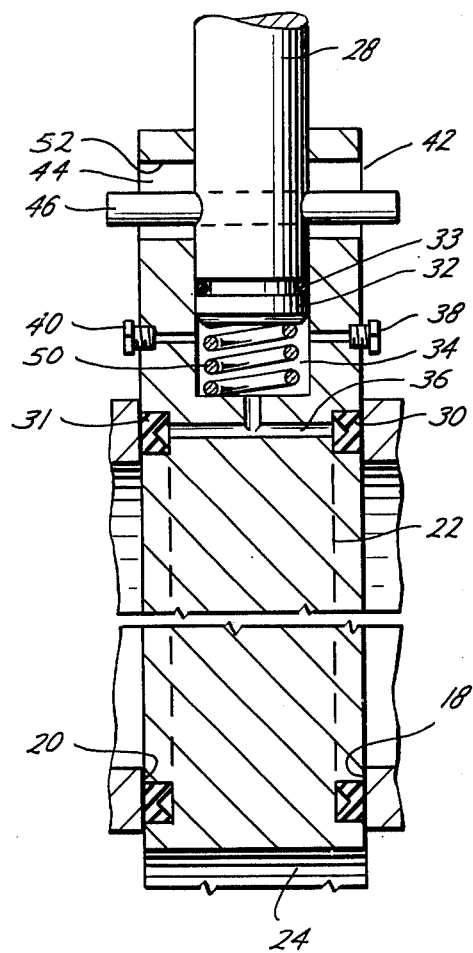

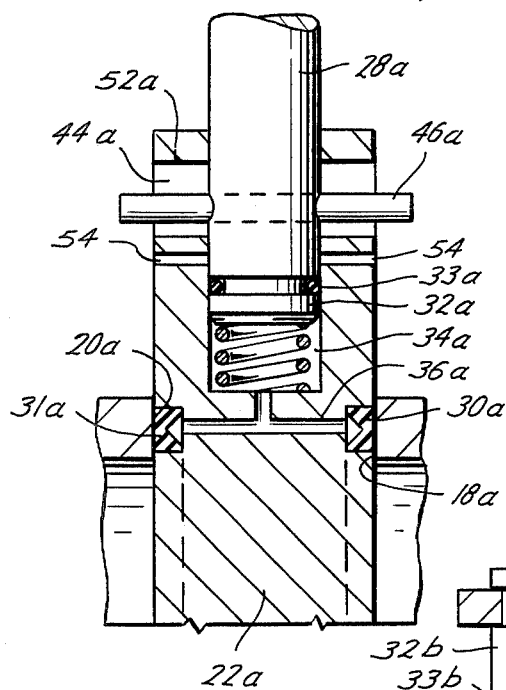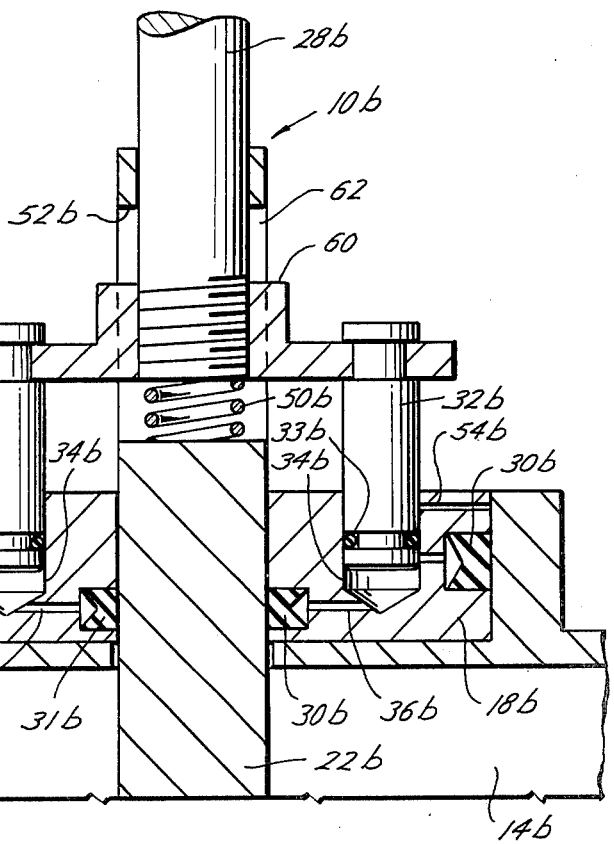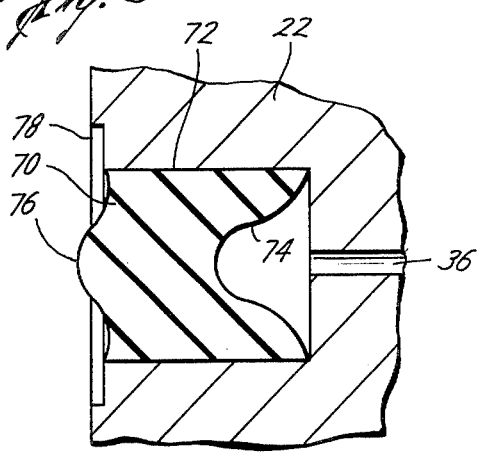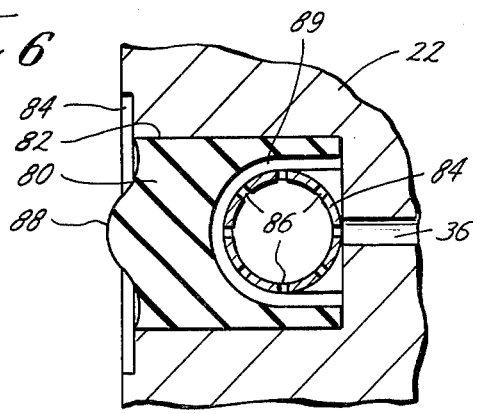

VALVE WITH SELF-ACTUATING FLUID SEAL

BACKGROUND OF THE INVENTION

Fluid-actuated seals allow greater sealing forces to be applied between a valve element and a valve seat whereby the valve may hold greater pressures. The use of fluid-actuated seal means which is actuated upon movement of the valve element are old as indicated in U.S. Pat. Nos. 2,726,842 and 3,321,176. However, it is undesirable to have the valve element move relative to the pressurized seals when they are energized, either while opening or closing, as this requires greater torque to actuate the valve and will also cause damage to the pressurized seals if the valve is actuated while they are pressurized.

The present invention is directed to a valve having self-actuated fluid seals in which the seals are pressurized only after the valve element is seated on the valve seat and which is depressurized prior to the valve element moving off of the valve seat.

SUMMARY

The present invention is directed to a valve having self-sealing fluid seals on either the valve seat or the valve element. Fluid-actuation means including a piston and cylinder are provided in fluid communication with the seal means for actuation of the seal means and the fluid-actuation means is connected to the valve-actuating means whereby the seal means are pressurized and released by movement of the valve-actuating means. Stop means are provided in the valve body for stopping the movement of the valve element when the valve element is in position against the valve seat and a lost motion connection is provided between the valve-actuating means and the valve element for allowing the valve-actuating means to pressurize and release the seal means without movement of the valve element. Spring means between the valve-actuating means and the valve element insure that the seal means are pressurized and released on closing and opening of the valve without movement of the valve element.

A further object of the present invention is the provision of a valve with the fluid-actuated seals and the fluid-actuating means positioned in the valve element whereby the entire sealing system may be repaired and/or replaced by merely removing the valve element from the valve.

Still a further object of the present invention is the provision of fluid-actuation means which may be either a closed system for insuring clean fluid or may be an open system utilizing the fluid flowing through the valve.

Yet a still further object of the present invention is the provision of seal means which includes a circular seal receiving recess in fluid communication with the fluid-actuation means with a seal bonded in the recess, a flexible shield positioned between the bonded seal and the fluid-actuation means and a rigid support member in the recess having a plurality of holes positioned between the flexible shield and the fluid-actuation means.

Other and further objects, features and advantages will be apparent from the following description of presently preferred embodiments of the invention, given for the purpose of disclosure and taken in conjunction with the drawings.

BRIEF DESCRIPTION OF THE DRAWINGS

FIG. 1 is an elevational view, partly in cross section, of a valve utilizing the preferred embodiment of the present invention, FIG. 2 is an enlarged fragmentary elevational view, partly in cross section, of the sealing arrangement and fluid actuation of the apparatus of FIG. 1, FIG. 3 is an enlarged fragmentary elevational view, partly in cross section, of a further embodiment of the present invention using an open fluid actuation means, FIG. 4 is a fragmentary elevational view, partly in cross section, of a further embodiment of the present invention in which the seals and fluid-actuation means are positioned in the valve seat instead of the valve element, FIG. 5 is an enlarged fragmentary elevational view, in cross section, of one type of seal means useful in the present invention, and FIG. 6 is an enlarged fragmentary elevational view, in cross section, of another type of seal means useful in the present invention.

DESCRIPTION OF THE PREFERRED EMBODIMENTS

While the present invention can be used in a short gate, wedge gate, ball or plug-type valve, for convenience of illustration the present invention will be described as being used in a conduit gate valve.

Referring now to the drawings, particularly FIG. 1, a valve, generally indicated by the reference numeral 10, includes a valve body 12 having an inlet 14 and an outlet 16, a valve seat 18 and 20, a valve element 22 and a body cavity 11. The valve element 22 is a gate for seating on one or both of the seats 18 and 20 for shutting off fluid flow from the inlet 14 to the outlet 16. The gate 22 may also include a circular opening 24 for moving to the open position between the inlet 14 and outlet 16 to provide a through conduit gate valve. A stop 26 is provided to engage the bottom of the gate 22 when it reaches the locking position shown in FIG. 1 for stopping movement of the valve element 22 when the valve element 22 is properly positioned against the valve seats 18 and 20.

Valve-actuating means are provided for moving the valve element 22 toward and away from the valve seats 18 and 20 such as a valve stem 28 with a conventional wheel actuator 90.

Circular fluid-actuated seal means are provided on one or both of the valve seats 18 and 20 or the valve element 22, here shown as being on the valve element 22. Thus, seal means 30 and 31 are provided on opposite faces of the gate 22 for sealing off against the valve seats 18 and 20, respectively, when the valve element is moved to the closed position. If desired, only seal means 31 may be utilized.

As best seen in FIG. 2, fluid-actuation means which generally include a piston 32, cylinder 34 and fluid passageways 36 in communication with the back side of the seals 30 and 31 are provided for pressurization and depressurization of the seal means 30 and 31. One of the piston and cylinder, here shown as the cylinder 34, is connected to the valve element 22 and the other, such as the piston 32, is connected to the valve-actuating stem 28 whereby relative movement between the valve stem 28 and the valve element 22 creates and releases fluid pressure on the back side of the seals 30 and 31. The fluid in the cylinder 34 and passageways 36 may be any suitable gas or liquid, preferably a hydraulic fluid. In the embodiment shown in FIGS. 1 and 2, fill plug 38 and vent plug 40 are connected to the cylinder 34 for filling the cylinder 34 and passageways 36 with fluid and venting air therefrom to provide a closed fluid system which is advantageous in those environments in which the fluid controlled by the valve 10 is particularly dirty.

As has been previously indicated, it is desirable to pressurize the seals 30 and 31 when the valve element 22 is moved into a closed position against the seats 18 and 20 in order to hold higher fluid pressures by the valve 10. However, it is undesirable that the gate 22 be moved either towards the closed position or towards the open position when the seals 30 and 31 are under pressure, as this requires a greater torque to close and open the valve 10 as well as unnecessarily subjecting the seals 30 and 31 to undesirable abrasion and wear against the moving gate 22.

In order to allow movement between the stem 28 and the valve element 22 for actuating and releasing the seals 30 and 31, a lost motion connection generally indicated by the reference numeral 42 is provided which may include a slot 44 in the valve element 22 and a pin 46 movable in the slot 44 and connected to the valve-actuating stem 28. In addition, a spring 50 is provided between the valve element 22 and the actuating stem 28, preferably in the cylinder 34. Thus, the pin 46 will be positioned adjacent the top 52 of the slot 44 when the valve element 22 is in the open position and therefore the pressure in the chamber 34 and passageways 36 will be at a minimum. However, as the valve element 22 moves into position against the valve seats 18 and 20, the element 22 will engage the stop 26 and the element 22 and seals 30 and 31 will then be positioned against the valve seats 18 and 20. Further downward movement of the stem 28 overcomes the spring 50 and relative movement is allowed between the stem 28 and the valve element 22 by the lost motion connection 42. Downward movement of the stem 28 moves the piston 32 into the cylinder 34 to force fluid against the back of the seals 30 and 31 to increase the sealing force of the seals 30 and 31 between the valve element 22 and the seats 18 and 20. On the other hand, when the valve is to be opened, the stem 28 is actuated upwardly, but before the pin 46 connected to the stem 28 engages the top 52 to move the valve element upwardly, the piston 32 has moved upwardly in the cylinder 34 thereby relieving the pressure on the cylinder 34 and passages 36 to relieve the pressure on the seals 30 and 31.

The embodiment of FIGS. 1 and 2 with the seals 30 and 31 and the fluid-actuation means positioned in the valve element 22 also has the advantage of allowing the element 22 to be removed from the valve 10 and repaired and/or replaced without removal of the valve 10 from the line.

Of course, various modifications of the preferred embodiment of FIGS. 1 and 2 may be made, such as shown in FIGS. 3 and 4, with the addition of suffixes "a" and "b", respectively, to designate like parts. In FIG. 3, the fill and vent plugs 38 and 40, respectively, shown in FIG. 2 have been omitted and the fluid-actuation means utilizes an open fluid system which traps the fluid in the cavity 11 moving through the valve 10 and utilizes the trapped fluid to pressurize and release the seals 30a and 31a. In the embodiment of FIG. 3, one or more openings 54 are provided between the cylinder 34a and the cavity 11 of the valve body 12. Thus, fluid in the cavity 11 of the valve body 12 may flow into the openings 54 and into the cylinder 34a and passageways 36a. When the valve is in the open position with the pin 46a adjacent the top 52a of the valve element 22a, the piston O-ring 33a will be positioned above the openings 54 thereby allowing fluid from the cavity 11 of the valve body 12 to flow through the openings 54 and into the cylinder 34a and the passages 36a. After the valve element 22a has been moved to the closed position against the stop 26a (not shown) the stem 28a will continue moving downwardly relative to the valve element 22a whereby the O-ring 33a moves past the openings 54 trapping the fluid in the cylinder 34a and passageways 36a to energize and pressurize the seals 30a and 31a. It is to be noted that the laterally directed openings 54 allow the O-ring seal 33a on the piston 32a to trap and pressurize and relieve pressure from the cylinder 34a without danger of being blown off of the piston 32a on pressurization and de-pressurization.

Referring now to FIG. 4, the fluid-actuated seal means and the fluid-actuation means are positioned in the valve seat instead of the valve element. Thus, one or more valve seats 18b and 20b are positioned on opposite sides of the valve element 22b. Each of the seats 18b and 20b may include a cylinder 34b and coacting pistons 32b. One or more fluid-actuated seals 30b and 31b are positioned in the valve seats 18b and 20b, respectively. The cylinders 34b are in fluid communication with the fluid seals through passageways 36b. The lost motion connection is a travel bar 60 which is connected to the valve element 22b by a spline and groove connection 62. The pistons 32b are connected to the travel bar 60 and thus are moved into and out of the cylinders 34b in response to actuation of the valve stem 28b. In FIG. 4, the valve gate 22b is then in the closed position and the pistons 32 have moved into the cylinders 34b whereby the piston O-rings 33b have moved past the openings 54b trapping fluid in the cylinders 34b and passageways 36b to pressurize the seals 30b and 31b into a tighter seal. When it is desired to open the valve 10b, the stem 28b is actuated upward and the travel bar 60 will move upwardly relative to the valve element 22b thereby releasing pressure in the cylinders 34b to relieve and depressurize the seals 30b and 31b. However, the valve element 22b will not begin moving from its closed position until the travel bar 60 reaches the top 52b in the lost motion connection. By then the piston seals 33b will have moved past the openings 54b and relieved the pressured on the seals 30b and 31b whereby the gate 22b may be opened without undue torque or without damaging the seals 30b and 32b. And moving to the closed position, the embodiment of FIG. 4 operates similarly to the embodiments of FIGS. 1-3 and the valve element 22b will be seated against a stop (not shown) by the action of the spring 50b prior to the energization of the fluid seals 30b and 31b by the pistons 32b.

While the seals 30, 31, 30a, 31a, 30b and 31b shown in FIGS. 1-4, respectively, may be of any suitable fluid-actuated seals and are shown rather schematically in FIGS. 1-4, enlarged views of suitable and preferred seals are shown in FIGS. 5 and 6. In FIG. 5, the seal 70 is preferably an elastomer inserted in a recess 72 in the valve seat or as shown in the valve element 22 in communication with a fluid passageway 36. The circular seal 70 includes a cavity 74 against which the pressure-actuated fluid may act. The sealing surface of the seal 70 may include a ridge 76 protruding outwardly from the recess 72 for engagement with the valve seat 20 when pressure is applied through fluid passageway 36 and behind seal 70. The valve element 22 may also include an opening 78 in the valve element 22 of a width larger than the width of the recess 72 into which the seal 70 may recede when the ridge 76 engages a valve seat. The seal 70 is molded and inserted into the recess 72 and may be easily replaced in the recess 72.

FIG. 6 is the preferred embodiment of the seal in which the circular seal 80 is an elastomer which is bonded or molded into the recess 82 in the valve seat or valve element, here shown as the valve element 22, and in communication with a fluid passageway 36. A circular metallic tube 84 is provided in the recess 82 and includes a plurality of openings 86 and is positioned between the seal 80 and the fluid passageways 36 through which the pressurized actuating fluid passes. A shield 89 is provided, preferably an elastomer, to prevent the bonded or molded elastomer seal 80 from filling and blocking the pressure port openings 86. The seal 80 may also include a ridge 88 protruding outwardly from the recess 82 and an opening 84 into which the ridge 88 may be pushed upon contact with a valve seat when pressure is applied through passageway 36 into metallic tube 84 and through openings 86.

The present invention, therefore, is well adapted to carry out the objects and attain the ends and advantages mentioned as well as others inherent therein. While presently preferred embodiments of the invention have been given for the purpose of disclosure, numerous changes in the details of construction and arrangement of parts may be made without departing from the spirit of the invention and the scope of the appended claims.

What is claimed is:
1. A valve comprising,
    a valve body,
    a valve seat in the valve body,
    a valve element adapted to make with the seat,
    valve-actuating means for moving the valve element toward and away from the valve seat,
    stop means in the valve body for stopping movement of the valve element when the valve element is positioned against the valve seat,
    resilient fluid-actuated seal means recessed in the valve element, said seal means bonded to said valve element for preventing fluid in the valve body from reaching the back of the seal means,
    fluid-actuation means including a piston and cylinder in fluid communication with said seal means for actuation of said seal means away from said valve element and toward said valve seat, said piston fixedly connected to said valve-actuating means whereby the seal means are fluid pressurized and released by movement of the actuation means,
    lost motion connection means between the actuating means and the valve element for allowing the actuating means to pressurize and release the seal means without movement of the valve element, and
    spring means between the valve-actuating means and said valve element for insuring that the valve element does not move while the seal means are fluid pressurized and released.
2. The apparatus of claim 1 wherein said seal means includes,
    a seal-receiving recess in fluid communication with the fluid-actuation means,
    a seal molded in said recess,
    a flexible shield positioned between the bonded seal and the fluid-actuation means.
3. The apparatus of claim 2 including,
    a rigid support member in said recess having a plurality of holes through which fluid passes positioned between the flexible shield and the fluid-actuation means.

* * * * *